J. A. GARDNER.
UNIVERSAL SEED PLANTER.
APPLICATION FILED AUG. 8, 1916.
1,206,215.
Patented Nov. 28, 1916.
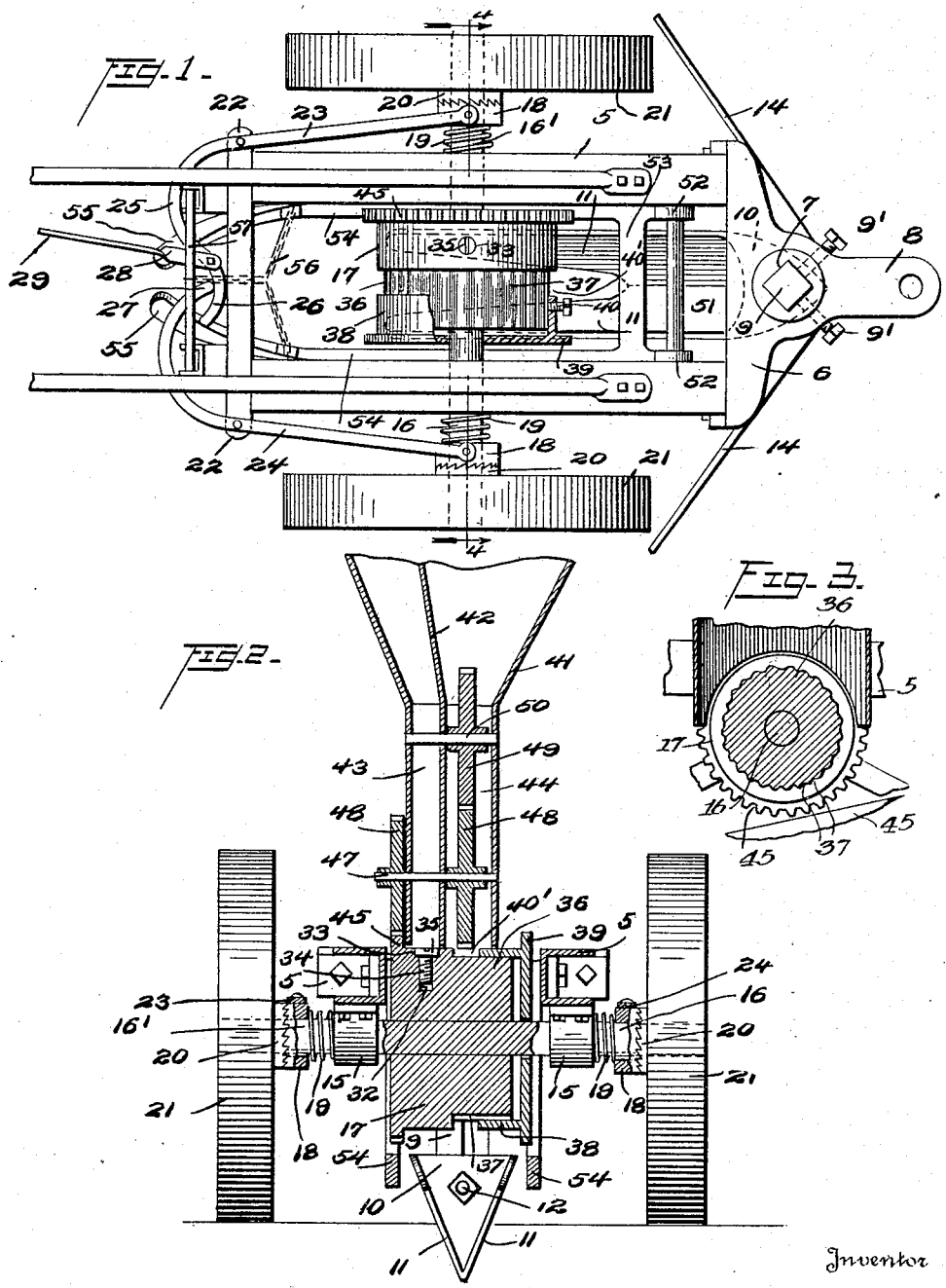
Inventor
John A. Gardner
By David P. Moore
Attorney

UNITED STATES PATENT OFFICE.

JOHN A. GARDNER, OF GRIFTON, NORTH CAROLINA.

UNIVERSAL SEED-PLANTER.

1,206,215.   Specification of Letters Patent.   Patented Nov. 28, 1916.

Application filed August 8, 1916.   Serial No. 113,712.

*To all whom it may concern:*

Be it known that I, JOHN A. GARDNER, a citizen of the United States, residing at Grifton, in the county of Pitt and State of North Carolina, have invented certain new and useful Improvements in Universal Seed-Planters, of which the following is a specification, reference being had therein to the accompanying drawing.

My present invention relates to improvements in universal seed planters, the present construction embodying the main features of that shown in my copending application, filed March 4, 1916, Serial Number 82,062, as relates to the seed distributing member, one object of the invention being the perfecting of the structure herein set forth as relates to the detailed construction of the seed distributing member, the furrow forming shoe and other co-acting members which coöperate to assist in the proper planting and covering of the seed.

A further object of this invention is the provision of a partitioned hopper whereby one compartment is adapted to contain and supply seeds of a certain nature, as for instance, corn, peas, beans, and the like, whereas the other compartment is adapted to contain cotton or exceedingly small seed that it is desired to drill.

A still further object of this invention is the embodiment in a universal seed planter of this character of many essential features which render the same simple, durable and inexpensive in construction and thoroughly efficient and practical in use.

In the accompanying drawings:—Figure 1 is a top plan view of the planter with the hopper removed and the handles broken away. Fig. 2 is a section taken on line 4—4 of Fig. 1. Fig. 3 is a cross section view through the lower end of the hopper and the distributing member.

Referring to the drawings, the numeral 5 designates the frame of the present planter which has secured to the forward end thereof the casting 6 provided with the square bore or opening 7 and with the clevis receiving lug 8.

The square shank 9 is vertically adjustable within the bore 7 and is held at any desired adjustment by means of the set screws 9′, the integral end 10 thereof forming the shoe 10′ having the lateral furrow forming blades 11 which permit of the direction of the seed therebetween, as will presently appear.

A bolt 12 attaches the earth cutting member 13 to the forward end of the member 10, while secured to the member 6 and extending in opposite directions are the guards 14 which prevent weeds or stubble from interfering with the operation of the present planter.

Carried by the under side of the frame 5 intermediate of the ends thereof are the two journal boxes 15 which receive the respective shafts 16 and 16′ which are formed integral with the double diametered cylinder member 17, the purpose of which will presently appear.

Splined upon the respective shafts 16 and 16′ are the slidable clutch members 18 which are normally held outward and in engagement with the clutch members 20 of the traction wheels 21 by means of the springs 19. Pivoted to the projections 22 of the frame are the two levers 23 and 24 which are operably connected at their forward ends to the clutch members 18.

The substantially S-shaped rear end 25 of the lever 23 has its terminal 26 so disposed as to engage the terminal 27 of the lever 24, so that when the link 28 is pulled upon through the instrumentality of the rod 29 and the pivoted hand grip 30, which in turn is attached to one of the handles 31, the forward ends of the levers 23 and 24 will be moved inwardly toward the center of the machine, and thus compress the springs 19 to release the clutch members 18 so that the wheels 21 may rotate freely without affecting the member 17.

The member 17 is provided with a plurality of radial double diametered sockets 32, the outer end 33 of which is smooth bored, so that the adjusting screws 34 may fit therein and regulate the depth by the holes 35 for the reception of corn or a similar seed to be planted.

The reduced end 36 of the member 17 is provided with the corrugated surface 37 which fits within the internally corrugated tubular cylinder 38 which is longitudinally adjustable thereon and is adaptable to be secured by any desired adjustment by means of the set screw 40, the rim 39 thereof being integral. By this means, the circumferential space 40′ is provided to receive the cotton seed and distribute the same between the members 11 of the furrow framing shoe.

The hopper 41 is provided with a partition 42 which divides the same into two compartments, 43 and 44, the lower ends of which fit astride of the seed distributing member which consists of the parts 17 and 38 so that the openings or radial bores 32 are disposed to aline with the lower end of the compartment 43, while the circumferential groove 40' alines with the lower end of the compartment 44.

Formed integral with one end of the member 17 are gear teeth 45 which mesh with the gear 46 carried upon the shaft 47 which is journaled transversely of the lower end of the hopper and has fixed thereon in the compartment 44 the agitating gear 48 which is in loose mesh with the superposed gear 49 loosely mounted upon the fixed shaft 50.

The rod 51 mounted at the lower end of the frame 5 has swingingly connected thereto the apertured lugs 52 which are fast by means of the integral cross bar 53 so that the arms 54 will properly carry the covering blades or shovels 55 which are suspended through the instrumentality of the chain 56 whose upper end is adapted to be connected by any desired means to the cross bar 57 of the handle.

What I claim as new is:

1. A seed planter having a frame, a seed distributing member journaled therein and comprising a double diametered cylindrical member and a cup shaped cylindrical member, the inner diameter of which telescopically fits upon the reduced diameter of the double diametered cylindrical member and whose inner edge coöperates with the shoulder between the double diametered portions to provide a circumferential seed distributing space, and means for locking the cup shaped member from longitudinal movement; and a hopper carried by the frame for supplying the seed to the circumferential seed distributing space.

2. A seed planter having a seed distributing member composed of a double diametered cylinder, the enlarged diameter of which is provided with a plurality of spaced peripheral pockets, adjustable means for regulating the depth of each pocket, and a cup shaped member for fitting upon the reduced diameter of said cylinder, and means for moving the cup shaped member to regulate the space between its inner end and the adjacent portion of the cylinder.

3. A seed planter having a frame, a seed distributing member journaled therein and comprising a double diametered cylindrical member and a cup shaped cylindrical member, the reduced diametered portion of the cylindrical member being provided with longitudinal corrugations forming seed receiving and directing surfaces while the interior of the cup shaped cylindrical member is correspondingly corrugated to telescopically fit thereon, the inner edge of the cup shaped cylindrical member coöperating with the shoulder between the double diametered portions to provide a circumferential seed distributing space, and means for locking the cup shaped member from longitudinal movement.

In testimony whereof I affix my signature.

JOHN A. GARDNER.

Copies of this patent may be obtained for five cents each, by addressing the "Commissioner of Patents, Washington, D. C."